(12) United States Patent
Tang et al.

(10) Patent No.: US 11,947,914 B2
(45) Date of Patent: Apr. 2, 2024

(54) FACT CHECKING BASED ON SEMANTIC GRAPHS

(71) Applicant: Microsoft Technology Licensing, LLC, Redmond, WA (US)

(72) Inventors: Duyu Tang, Beijing (CN); Nan Duan, Beijing (CN); Ming Zhou, Beijing (CN); Jiun-Hung Chen, Redmond, WA (US); Pengcheng Wang, Redmond, WA (US); Ying Qiao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 723 days.

(21) Appl. No.: 16/916,599

(22) Filed: Jun. 30, 2020

(65) Prior Publication Data

US 2021/0406475 A1     Dec. 30, 2021

(51) Int. Cl.
*G06F 40/30* (2020.01)
*G06F 16/21* (2019.01)
*G06N 3/08* (2023.01)

(52) U.S. Cl.
CPC ............ *G06F 40/30* (2020.01); *G06F 16/212* (2019.01); *G06N 3/08* (2013.01)

(58) Field of Classification Search
None
See application file for complete search history.

(56) References Cited

U.S. PATENT DOCUMENTS 9,177,053 B2 * 11/2015 Myslinski ............ H04N 21/258
11,521,041 B2 * 12/2022 Chen ...................... G06N 5/046
2009/0265304 A1 * 10/2009 Ait-Mokhtar .......... G06F 16/30
2019/0361961 A1 * 11/2019 Zambre ............... G06F 16/2365
2019/0379628 A1    12/2019 Wu et al.
2020/0004882 A1 *  1/2020 Kulkarni ................ G06F 17/18
(Continued)

FOREIGN PATENT DOCUMENTS

KR         20190107832 A        9/2019

OTHER PUBLICATIONS

Jie Zhou, Xu Han, Cheng Yang, Zhiyuan Liu, Lifeng Wang, Changcheng Li, and Maosong Sun, "GEAR: Graph-based Evidence Aggregating and Reasoning for Fact Verification", Jul. 22, 2019, ACL 2019 (Year: 2019).*

(Continued)

*Primary Examiner* — Nafiz E Hoque
(74) *Attorney, Agent, or Firm* — Schwegman Lundberg Woessner, P.A.

(57) ABSTRACT

In embodiments of the present disclosure, there is provided an approach for fact checking based on semantic graphs. According to embodiments of the present disclosure, after obtaining a text to be fact checked, a plurality of evidence sentences related to the text are retrieved from an evidence database. Then, semantic graphs of the text and the evidence sentences are constructed based on the semantic analysis, and a veracity of a statement in the text can be determined based on the semantic graphs. Embodiments of the present disclosure propose a graph-based reasoning approach for fact checking, and use the constructed semantic graphs to facilitate verification of the truthfulness of the text, thereby improving the accuracy for fact checking.

20 Claims, 4 Drawing Sheets

(56) References Cited

U.S. PATENT DOCUMENTS

2020/0160196 A1* 5/2020 Ramakrishnan ....... G06N 20/00
2020/0174991 A1* 6/2020 Rendahl ............. G06Q 30/0245

OTHER PUBLICATIONS

Angeli, et al., "NaturalLI: Natural Logic Inference for Common Sense Reasoning", In Proceedings of the 2014 Conference on Empirical Methods in Natural Language Processing (EMNLP), Oct. 25, 2014, pp. 534-545.

Chen, et al., "Enhanced LSTM for Natural Language Inference", In Proceedings of the 55th Annual Meeting of the Association for Computational Linguistics, Jul. 30, 2017, 12 Pages.

Dagan, et al., "Recognizing Textual Entailment: Models and Applications", In Synthesis Lectures on Human Language Technologies, vol. 6, Issue 4, Jul. 19, 2013, pp. 1-220.

Devlin, et al., "Bert: Pre-Training of Deep Bidirectional Transformers for Language Understanding", In Journal of Computing Research Repository, Oct. 2018, 16 Pages.

Faris, et al., "Partisanship, Propaganda, and Disinformation: Online Media and the 2016 US Presidential Election", In Publication of Berkman Klein Center for Internet & Society Research, Aug. 6, 2017, 142 Pages.

Ferreira, et al., "Emergent: A Novel Data-Set for Stance Classification", In Proceedings of the Conference of the North American Chapter of the Association for Computational Linguistics: Human Language Technologies, Jun. 12, 2016, pp. 1163-1168.

Hanselowski, et al., "UKP-Athene: Multi-Sentence Textual Entailment for Claim Verification", In Journal of Computing Research Repository, Sep. 2018, 6 Pages.

Kipf, et al., "Semi-Supervised Classification with Graph Convolutional Networks", In 5th International Conference on Learning Representations, Apr. 24, 2017, 14 Pages.

Liu, et al., "Roberta: A Robustly Optimized BERT Pretraining Approach", In Journal of Computing Research Repository, Jul. 2019, 13 Pages.

Nakashole, et al., "Language-Aware Truth Assessment of Fact Candidates", In Proceedings of the 52nd Annual Meeting of the Association for Computational Linguistics, vol. 1: Long Papers, Jun. 22, 2014, pp. 1009-1019.

Nie, et al., "Combining Fact Extraction and Verification with Neural Semantic Matching Networks", In Proceedings of the AAAI Conference on Artificial Intelligence, vol. 33, Jul. 17, 2019, pp. 6859-6866.

Peters, et al., "Deep Contextualized Word Representations", In Journal of Computing Research Repository, Feb. 2018, 15 Pages.

Popat, et al., "DeClarE: Debunking Fake News and False Claims using Evidence-Aware Deep Learning", In Repository of arXiv:1809.06416, Sep. 17, 2018, 11 Pages.

Rashkin, et al., "Truth of Varying Shades: Analyzing Language in Fake News and Political Fact-Checking", In Proceedings of The Conference on Empirical Methods in Natural Language Processing, Sep. 7, 2017, pp. 2931-2937.

Schuster, et al., "Towards Debiasing Fact Verification Models", In Journal of Computing Research Repository, Aug. 2019, 9 Pages.

Shen, et al., "Improved Semantic-Aware Network Embedding with Finegrained Word Alignment", In Repository of arXiv:1808.09633, Aug. 29, 2018, 10 Pages.

Shi, et al., "Simple BERT Models for Relation Extraction and Semantic Role Labeling", In Journal of Computing Research Repository, Apr. 10, 2019, 6 Pages.

Soleimani, et al., "BERT for Evidence Retrieval and Claim Verification", In Proceedings of the 27th International Conference on Computational Linguistics (COLING), Oct. 7, 2019, 9 Pages.

Speer, et al., "Conceptnet 5.5: An Open Multilingual Graph of General Knowledge", In Journal of Computing Research Repository, Dec. 2016, 9 Pages.

Thorne, et al., "Adversarial Attacks Against Fact Extraction and Verification", In Journal of Computing Research Repository, Mar. 2019, 13 Pages.

Thorne, et al., "Automated Fact Checking: Task Formulations, Methods and Future Directions", In Journal of Computing Research Repository, Jun. 20, 2018, 14 Pages.

Thorne, et al., "Fever: A Large-Scale Dataset for Fact Extraction and Verification", In Journal o Computing Research Repository, Mar. 2018, 20 Pages.

Thorne, et al., "The Fact Extraction and Verification (Fever) Shared Task", In Journal o Computing Research Repository, Nov. 2018, 9 Pages.

Veličković, et al., "Graph Attention Networks", In Journal of Computing Research Repository, Oct. 2017, pp. 1-11.

Vlachos, et al., "Fact Checking: Task Definition and Dataset Construction", In Proceedings of the ACL Workshop on Language Technologies and Computational Social Science, Jun. 26, 2014, pp. 18-22.

Vosoughi, et al., "The Spread of True and False News Online", In Journal of Science, vol. 359, Issue 6380, Mar. 9, 2018, pp. 1-6.

Wang, Williamy. , "Liar, Liar Pants on Fire": A New Benchmark Dataset for Fake News Detection, In Proceedings of the 55th Annual Meeting of the Association for Computational Linguistics (vol. 2: Short Papers), May 1, 2017, 5 Pages.

Yang, et al., "XInet: Generalized Autoregressive Pretraining for Language Understanding", In Journal of Computing Research Repository, Jun. 2019, 18 Pages.

Yin, et al., "Twowingos: A Two-Wing Optimization Strategy for Evidential Claim Verification", In Journal of Computing Research Repository, Aug. 28, 2018, 10 Pages.

Yoneda, et al., "UCL Machine Reading Group: Four Factor Framework for Fact Finding (HexaF)-", In Proceedings of the First Workshop on Fact Extraction and Verification, Nov. 1, 2018, pp. 97-102.

Zellers, et al., "Defending Against Neural Fake News", In Journal of Advances in Neural Information Processing Systems, Oct. 29, 2019, 12 Pages.

Zhang, et al., "Fakedetector: Effective Fake News Detection with Deep Diffusive Neural Network", In 36th IEEE International Conference on Data Engineering, Apr. 20, 2020, 13 Pages.

Zhong, et al., "Reasoning Over Semantic-Level Graph for Fact Checking", In Journal of Computing Research Repository, Sep. 2019, 8 Pages.

Zhou, et al., "GEAR: Graph-Based Evidence Aggregating and Reasoning for Fact Verification", In Proceedings of the 57th Annual Meeting of the Association for Computational Linguistics, Jul. 22, 2019, 10 Pages.

* cited by examiner

FACT CHECKING BASED ON SEMANTIC GRAPHS

BACKGROUND

Machine reasoning is a process of drawing a conclusion from the principles and evidences, and generates an output to an unseen input by manipulating existing knowledge with inference technique, which is a challenging task in artificial intelligence (AI) and natural language processing (NLP). Recently, machine reasoning is widely used in tasks such as question answering, fact checking, natural language reasoning, visual reasoning, visual question answering, and document-level question answering and the like.

Fact checking is the act of checking factual information in a text in order to determine the veracity and correctness of a statement in the text, and may be used to determine whether the statement is true. Internet provides an efficient way for individuals and organizations to quickly spread information to massive audiences. However, some pre-trained language models can produce remarkably coherent and fluent texts, and malicious people may enjoy spreading false news, which may have significant influence on public opinions, stock prices and so on. The fact checking task aims at automatically assessing the truthfulness of a textual statement, and it may be used to identify the statement in the text, such as fake information on the Internet.

SUMMARY

In embodiments of the present disclosure, there is provided an approach for fact checking based on semantic graphs. According to embodiments of the present disclosure, after obtaining a text to be fact checked, a plurality of evidence sentences related to the text are retrieved from an evidence database. Then, semantic graphs of the text and the evidence sentences are constructed based on the semantic analysis, and a veracity of a statement in the text can be determined based on the semantic graphs. Embodiments of the present disclosure propose a graph-based reasoning approach for fact checking, and use the constructed semantic graphs to facilitate verification of the truthfulness of the text, thereby improving the accuracy for fact checking.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other features, advantages and aspects of embodiments of the present disclosure will be made more apparent by describing the present disclosure in more detail with reference to drawings. In the drawings, the same or like reference signs represent the same or like elements, wherein.

DETAILED DESCRIPTION

Embodiments of the present disclosure will be described in more detail below with reference to figures. Although the drawings show some embodiments of the present disclosure, it should be appreciated that the present disclosure may be implemented in many forms and the present disclosure should not be understood as being limited to embodiments illustrated herein. On the contrary, these embodiments are provided herein to enable more thorough and complete understanding of the present disclosure. It should be appreciated that drawings and embodiments of the present disclosure are only used for exemplary purposes and not used to limit the protection scope of the present disclosure.

As used herein, the term "include" and its variants are to be read as open terms that mean "include, but not limited to." The term "based on" is to be read as "based at least in part on." The term "an embodiment" is to be read as "at least one embodiment." The term "another embodiment" is to be read as "at least one other embodiment." The term "some embodiments" is to be read as "at least some embodiments." Definitions of other terms will be given in the text below.

Fact checking is a challenging task because verifying the truthfulness of a textual statement requires reasoning about multiple retrievable evidences. Traditional methods retrieve some evidence sentences related to a text for fact checking, and concatenate these evidence sentences into a single string, or use feature fusion to aggregate the features of separated evidence sentences. However, simply concatenating the evidence sentences as a single string would result in a large distance between relevant information pieces from different evidence sentences, and the feature fusion aggregates the information in an implicit way, which makes it hard to reason over structural information. Thus, traditional methods fail to capture rich semantic structures among the evidence sentences and cannot leverage the semantic structures to verify the truthfulness of the statement in the text, which affects the accuracy for fact checking.

To this end, a new approach for fact checking based on semantic graphs is proposed, which operates on rich semantic structures of the evidence sentences. Embodiments of the present disclosure propose a graph-based reasoning approach for fact checking, and construct semantic graphs of the text and the evidence sentences and then use the constructed semantic graphs to facilitate verification of the text. As compared with the traditional methods, embodiments of the present disclosure can improve the accuracy for fact checking by mining and using the semantic structures of the evidence sentences.

Reference is made below to FIG. 1 through FIG. 7 to illustrate basic principles and several example embodiments of the present disclosure herein.

Figure 1:
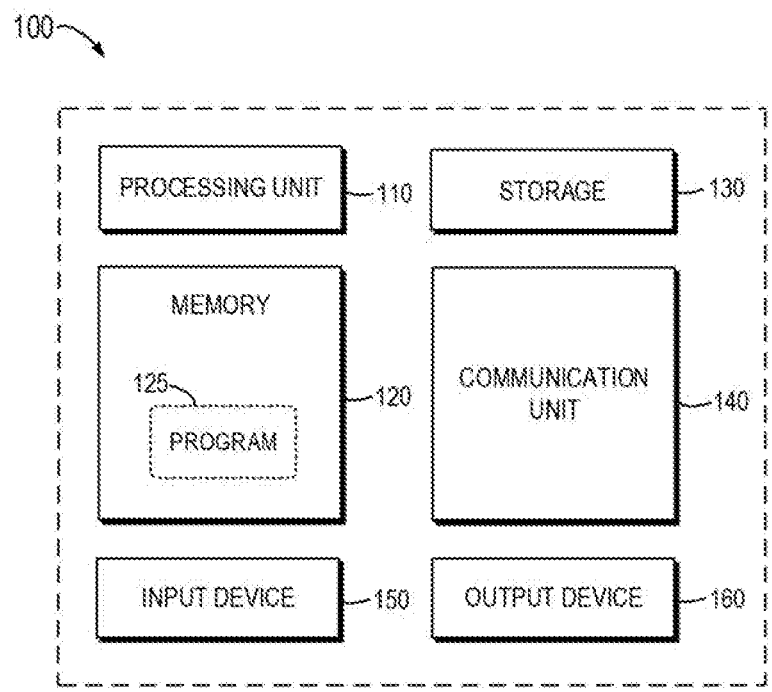
FIG. 1 illustrates a block diagram of a computing device/server in which one or more embodiments of the present disclosure may be implemented.

FIG. 1 illustrates a block diagram of a computing device/server 100 in which one or more embodiments of the present disclosure may be implemented. It would be appreciated that the computing device/server 100 as described in FIG. 1 is merely for illustration but not limit the function and scope of embodiments of the present disclosure in any manners. For example, the computing device/server 100 may be a computer or a server.

As shown in FIG. 1, the computing device/server 100 is in the form of a general-purpose computing device. Components of the computing device/server 100 may include, but are not limited to, one or more processor(s) or processing unit(s) 110, a memory 120, a storage device 130, one or more communication unit(s) 140, one or more input device(s) 150, and one or more output device(s) 160. The processing unit 110 may be a physical or virtual processor and perform various processes based on programs stored in the memory 120. In a multiprocessor system, a plurality of processing units may execute computer executable instructions in parallel to improve parallel processing capability of the computing device/server 100.

The computing device/server 100 typically includes various computer storage media. The computer storage media may be any media accessible by the computing device/server 100, including but not limited to volatile and non-volatile media, or removable and non-removable media. The memory 120 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof.

As shown in FIG. 1, the memory 120 may include a program 125 for implementing the semantic graph-based fact checking according to embodiments of the present disclosure, which may have one or more sets of program modules configured to execute methods and functions of various embodiments described herein. The storage device 130 can be any removable or non-removable media and may include machine-readable media such as a flash drive, disk, and any other media, which can be used for storing information and/or data and accessed within the computing device/server 100. For example, the storage device 130 may be a hard disc drive (HDD) or a solid state drive (SSD).

The computing device/server 100 may further include additional removable/non-removable or volatile/non-volatile storage media. Although not shown in FIG. 1, a magnetic disk drive is provided for reading and writing from/to a removable and non-volatile disk (e.g., "a floppy disk") and an optical disk drive may be provided for reading or writing from/to a removable non-volatile optical disk. In such cases, each drive is connected to the bus (not shown) via one or more data media interfaces.

The communication unit 140 communicates with another computing device via communication media. Additionally, functions of components in the computing device/server 100 may be implemented in a single computing cluster or a plurality of computing machines that are communicated with each other via communication connections. Therefore, the computing device/server 100 can be operated in a networking environment using a logical connection to one or more other servers, network personal computers (PCs), or another network node.

The input device 150 may include one or more input devices such as a mouse, keyboard, tracking ball and the like. The output device 160 may include one or more output devices such as a display, loudspeaker, printer, and the like. The computing device/server 100 can further communicate, via the communication unit 140, with one or more external devices (not shown) such as a storage device or a display device, one or more devices that enable users to interact with the computing device/server 100, or any devices that enable the computing device/server 100 to communicate with one or more other computing devices (for example, a network card, modem, and the like). Such communication can be performed via input/output (I/O) interfaces (not shown). Next, reference is made below to FIGS. 2-7 to specify example embodiments of the present disclosure.

Figure 2:
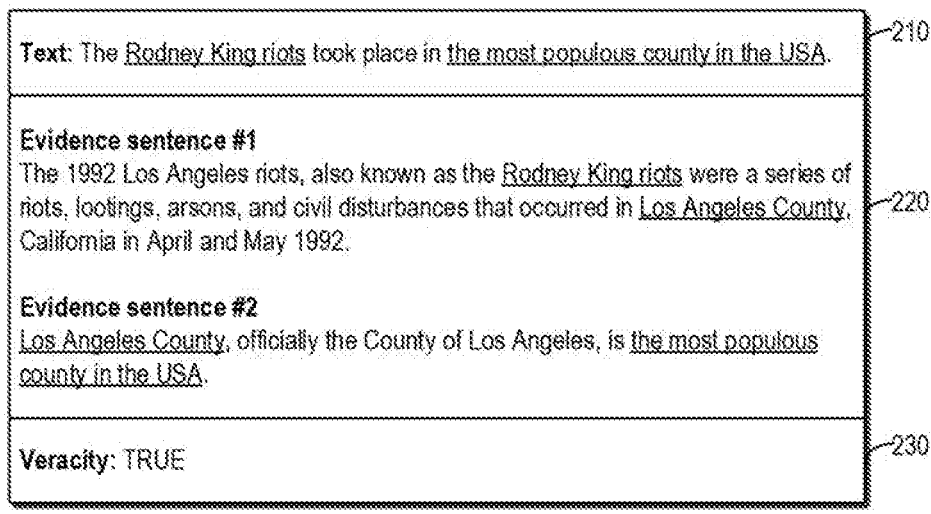
FIG. 2 illustrates an example for fact checking based on the evidence sentences according to an embodiment of the present disclosure.

FIG. 2 illustrates an example for fact checking based on the evidence sentences according to an embodiment of the present disclosure. In the example of FIG. 2, the example text 210 is "The Rodney King riots took place in the most populous county in the USA," and the related evidence sentences 220, including evidence sentence #1 and evidence sentence #2, are retrieved and selected from an evidence database such as Wikipedia.

As shown in FIG. 2, the text 210 includes the phrases "Rodney King riots" and "the most populous county in the USA." However, the evidence sentence #1 only mentions the "Rodney King riots" without reciting "the most populous county in the USA," while the evidence sentence #2 only mentions the "the most populous county in the USA" without reciting "Rodney King riots." As a result, a single sentence in the evidence sentences 220 cannot be sufficient to verify the statement in the text 210.

The evidence sentence #1 and the evidence sentence #2 may be correlated through the common entity "Los Angeles County." Verifying the statement in the text 210 requires a model to reason based on the understanding that "Rodney King riots" occurred in "Los Angeles County" from the evidence sentence #1, and that "Los Angeles County" is "the most populous county in the USA" form the evidence sentence #2, which needs to mine the semantic structures of the evidence sentences 220. Accordingly, the veracity 230 of the statement in the text 210 can be determined based on the semantic analysis to the evidence sentences 220. In embodiments of the present disclosure, semantic graphs of the text 210 and evidence sentences 220 are constructed so as to mine the semantic structures of text and evidence sentences and leverage the semantic structures to verify the truthfulness of the statement in the text.

Figure 3:
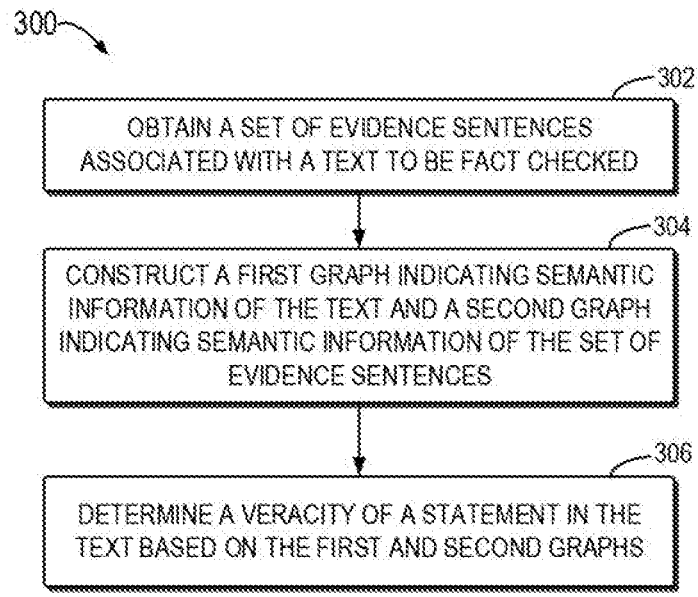
FIG. 3 illustrates a flow chart of a method for fact checking based on semantic graphs according to embodiments of the present disclosure.

FIG. 3 illustrates a flow chart of a method 300 for fact checking based on semantic graphs according to embodiments of the present disclosure. It should be appreciated that the method 300 may be executed by the computing device/server 100 as described with reference to FIG. 1.

At 302, a set of evidence sentences associated with a text to be fact checked is obtained. For example, after receiving a text to be fact checked, a plurality of evidence sentences related to the text may be retrieved from an evidence database, where the evidence database may store a lot of trustable documents or passages, such as Wikipedia, authority sites and books. In some embodiments, the text may be obtained from a multimedia source, such as a speech via the speech recognition, an image via the image recognition and so on. In some embodiments, the text may include one or more sentences indicating one or more statements, where a statement is a declarative sentence that is either true or false. An example of a statement is "The sun is bigger than the earth," which is true. Instead, if the statement is "The sun is smaller than the earth," the statement is determined to be false. In embodiments of the present disclosure, the retrieved evidence sentences may be used to determine whether the statement in the text is true or false.

At 304, a first graph indicating semantic information of the text and a second graph indicating semantic information of the set of evidence sentences are constructed. Semantic graphs of the text and the evidence sentences are constructed respectively based on shallow semantic parsing to the text and the evidence sentences. For example, semantic role labelling may be performed to the evidence sentences to extract elements as node in the semantic graph, and then edges are created among the nodes whose contents are correlated semantically. In this way, the semantic information among the evidence sentences may be collected and reflected in the graph.

At 306, a veracity of a statement in the text based on the first and second graphs is determined. For example, the text may claim a statement which may be true or false, and the text may be compared with the evidence sentences by matching nodes in the first graph and the second graph. In some embodiments, consider that semantically related words should have short distances, the constructed graphs may be used to re-define the relative distances of words, and the constructed graphs may be also used to propagate and aggregate information from neighboring nodes. Accordingly, the method 300 can improve the accuracy for fact checking by constructing and using the semantic graphs of the text and the evidence sentences, and a more accuracy veracity of a statement in the text can be obtained.

Figure 4:
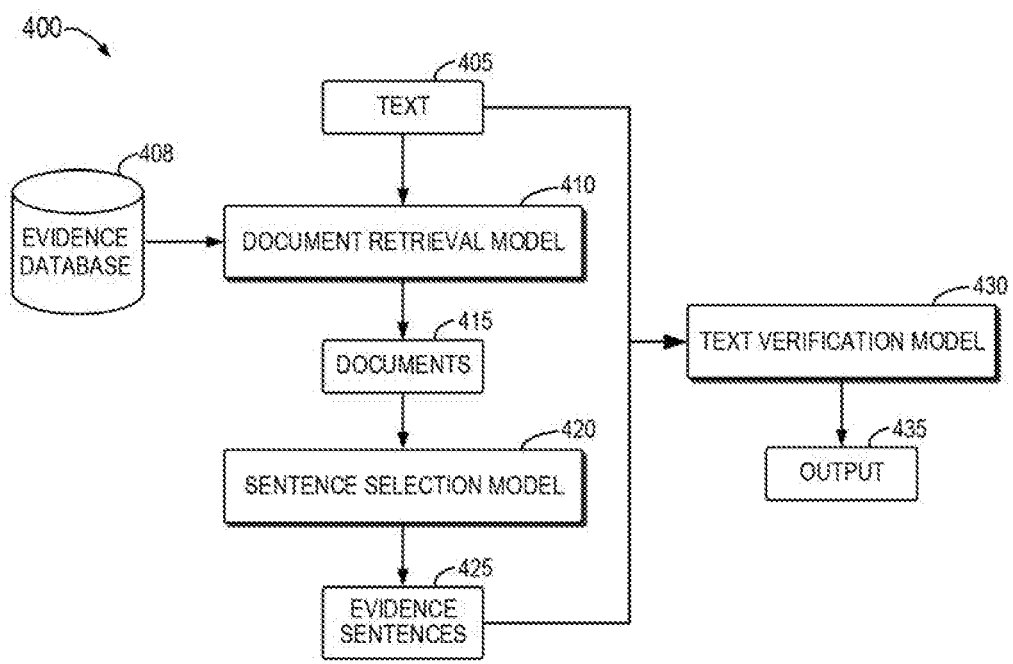
FIG. 4 illustrates an architecture for fact checking an input text according to embodiments of the present disclosure.

FIG. 4 illustrates architecture 400 for fact checking an input text according to embodiments of the present disclosure. As shown in FIG. 4, the architecture 400 comprises a document retrieval model 410, a sentence selection model 420, a text verification model and an evidence database 408. For a given text, the document retrieval model 410 retrieves the most related documents from the evidence database 408, and the sentence selection model 420 then select top-k related sentences from the retrieved documents as the evidence sentences. The text verification model 430 takes the given text and the selected evidence sentences as input and outputs the veracity of the statement in the given text.

As shown in FIG. 4, the document retrieval model 410 takes the text 405 and the evidence database 408 as the input, and outputs top-m most relevant documents 415. For example, the text 405 may be the preceding text 210, and the evidence database 408 may store contents collected from Wikipedia, authority websites, books, newspapers and other trustable sources. In some embodiments, the document retrieval model 410 may use keyword matching to filter candidate documents from the massive documents in evidence database 408. For example, top 10 documents may be selected from the evidence database 408.

The sentence selection model 420 takes the text 405 and all candidate sentences in the retrieved documents 415 as the input, and outputs top-k most relevant sentences as the evidence sentences 425 for verifying the text 405. In some embodiments, the sentence selection model 420 selects the evidence sentences 425 from all candidate sentences in the retrieved documents 415 by using contextual representations embodied in a pre-trained model, and the relevance of the text 405 and each candidate sentence in the retrieved documents 415 may be determined. The evidence sentences 425 may be the preceding evidence sentences 220. For example, for the $i^{th}$ candidate sentence, the input of the sentence selection model 420 is as below:

$$ce_i=[\text{Text},\text{SEP},\text{Sentence}_i,\text{SEP},\text{CLS}] \quad (1)$$

Where Text denotes tokenized word-pieces of original text 405, Sentence$_i$ denotes $i^{th}$ candidate sentence, SEP is a symbol indicating ending of a sentence, and CLS is a symbol indicating ending of the whole input.

The final representation $h_{ce_i} \in \mathcal{R}^d$ may be obtained by extracting the hidden vector of the [CLS] token. Next, a score $s_{ce_i}^+$ for $i^{th}$ candidate sentence may be determined through a multilayer perceptron layer and a softmax layer. All the candidate sentences may be ranked by the determined scores, and for example top 5 candidate sentences may be selected as the evidence sentences 425. In some embodiments, the sentence selection model 420 may be trained on the training data with a standard cross-entropy loss.

The text verification model 430 takes the text 405 and the selected evidence sentences 425 as the input, and generates an output 435 indicating the veracity of the statement in the text 405. The text verification model 430 uses the intrinsic structure of evidence sentences 425 to access the truthfulness of the statement(s) in the text 405, and makes understanding of the semantic structures of evidence sentences 425 and reasons bases on the semantic structures. In some embodiments, the text verification model 430 may comprises a graph construction module for constructing graphs, a graph-based pre-trained model with graph-based distance calculation, and a graph convolutional network and a graph attention network for propagating and aggregating information over the graphs. Example implementation of the text verification model 430 is described with reference to the following FIGS. 5-7.

Figure 5:
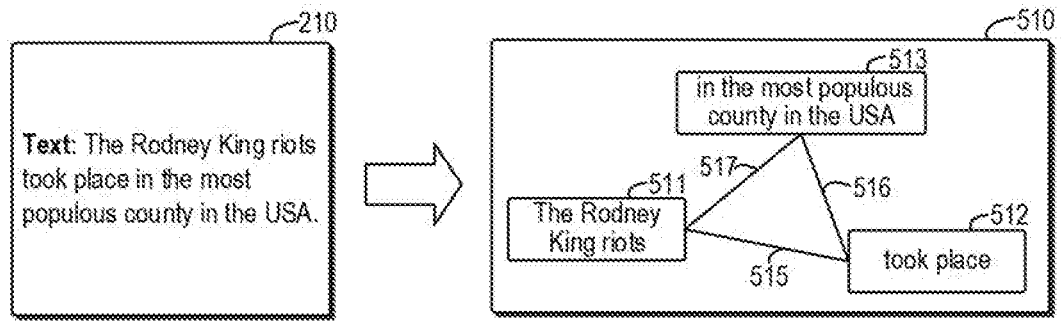
FIG. 5 illustrates an example semantic graph of a text constructed according to an embodiment of the present disclosure.

FIG. 5 illustrates an example semantic graph of a text constructed by the graph construction module according to an embodiment of the present disclosure. The graph construction module may construct a semantic graph 510 for the text 210 to reveal the semantic structure of the text 210. In some embodiments, the semantic graph 510 may be generated based on semantic parsing such as semantic role labelling (SRL), open information extraction, named entity recognition plus relation classification, sequence-to-sequence generation trained to produce structured tuples and so on. SRL is a process that assigns labels to words or phrases in a sentence that indicate their semantic role in the sentence, which is also called shallow semantic parsing, and SRL is performed to identify arguments and their roles in the sentence.

In some embodiments, the SRL toolkit may be used to parse the text 210 into three elements, and the three elements may be used as nodes 511, 512, 513 in the graph 510. The element of node 511 is an argument type, the element of node 512 is a verb type, and element of node 513 is a location type. Then, edges for every two nodes within the subgraph 510 are created, for example, edge 515 is created between node 511 and node 512, edge 516 is created between node 512 and node 513, and edge 517 is created between node 513 and node 511. In this way, the semantic information in the text 210 can be obtained by constructing the graph 510.

Figure 6:
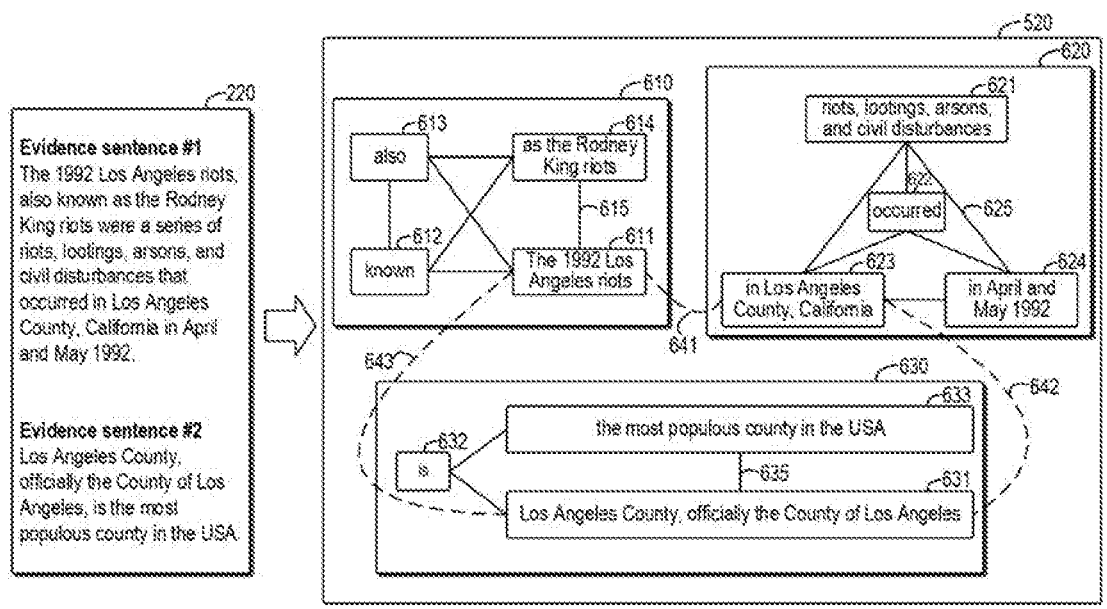
FIG. 6 illustrates another example semantic graph of two evidence sentences constructed according to an embodiment of the present disclosure.

FIG. 6 illustrates another example semantic graph of two evidence sentences constructed by the graph construction module according to an embodiment of the present disclosure. The graph construction module may construct a semantic graph 520 for the evidence sentences 220 to reveal the semantic structures of the evidence sentences 220.

The graph construction for evidence sentences 220 may involves three stages. In the first stage, the SRL toolkit parses each sentence of the evidence sentences 220 into one or more tuples (referred to as "subgraphs"), where each subgraph comprises elements as nodes. As shown in FIG. 6, the evidence sentence #1 is parsed into two subgraphs 610 and 620, while the evidence sentence #2 is parsed into one subgraph 630. The subgraph 610 is triggered by the verb "known," the subgraph 620 is triggered by the verb "occurred," and subgraph 630 is triggered by the verb "is."

In the second stage, the elements in each subgraph are used as nodes of the graph 520. As shown in FIG. 6, the subgraph 610 comprises nodes 611, 612, 613, 614, the subgraph 620 comprises nodes 621, 622, 623, 624, and the subgraph 630 comprises nodes 631, 632, 633. In some embodiments, the elements may have several predefined types such as verb, arguments, location, temporal, which may be extended to include more types. Next, edges for every two nodes within the same subgraph are created, for example, edge 615 is created between node 611 and node 614 in the subgraph 610, edge 625 is created between node 621 and node 624 in the subgraph 620, and edge 635 is created between node 631 and node 633 in the subgraph.

In the third stage, edges for nodes across different subgraphs are created to capture the semantic information among the evidence sentences 220. For example, if the two nodes in two subgraphs are literally similar with each other, an edge may be created between the two nodes. As shown in FIG. 6, since the node 611 in subgraph 610 and the node 623 in subgraph 620 both relate to "Los Angeles," an edge 641 may be created across the subgraph 610 and subgraph 620. Likewise, an edge 642 is created across the subgraph 620 and subgraph 630, and an edge 643 is created across the subgraph 630 and subgraph 610. In some embodiments, assuming a first entity and a second entity come from different subgraphs, one edge is added if one of the following conditions is satisfied: (1) the first entity equals the second entity; (2) the first entity contains the second entity; and (3) the number of overlapped words between the first entity and the second entity is larger than the half of the minimum number of words in the first entity and the second entity. In this way, the semantic information in the evidence sentences 220 can be obtained by constructing the graph 520, which facilitates understanding the semantic relationships among the evidence sentences 220. In some embodiments, an external knowledge base may be used to indicate the logical relationship between two different words or phrases, for example, "a novel" is a type of "a book."

Figure 7:
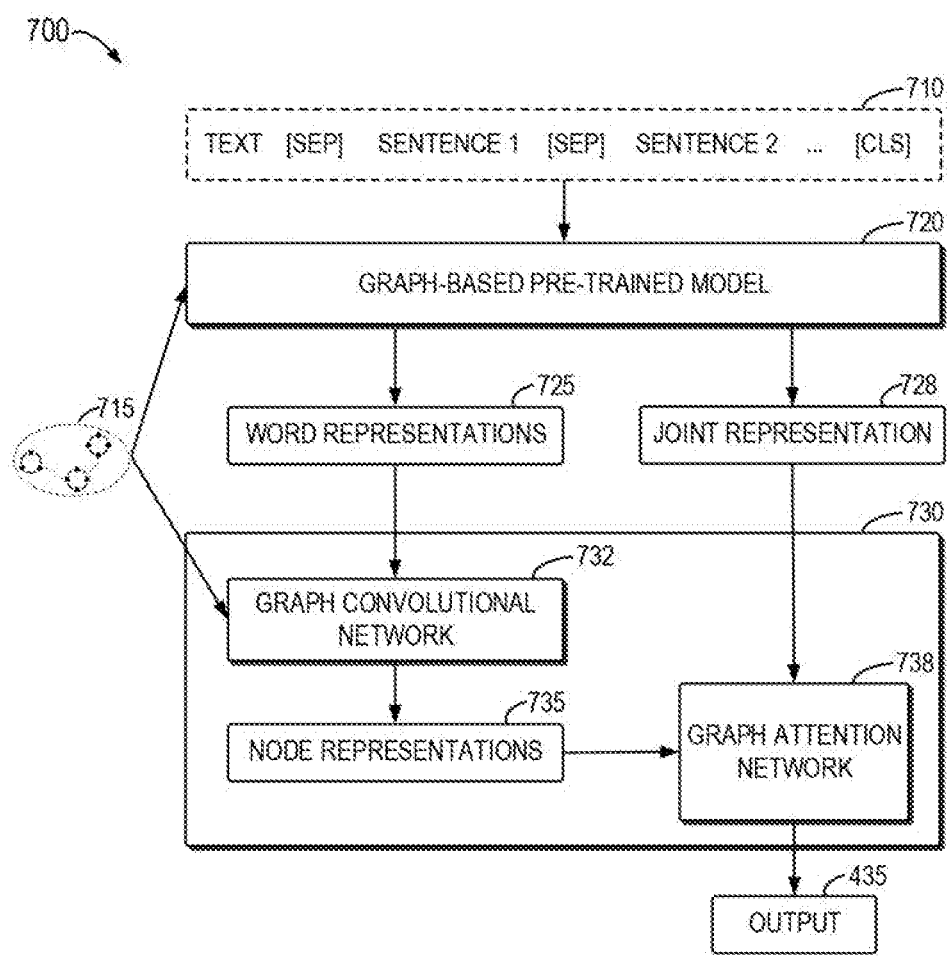
FIG. 7 illustrates a graph-based reasoning architecture for fact checking according to embodiments of the present disclosure.

FIG. 7 illustrates a graph-based reasoning architecture 700 for fact checking according to embodiments of the present disclosure. As shown in FIG. 7, the graph-based reasoning architecture 700 comprises a graph-based pre-trained model 720 with graph-based distance calculation, a graph convolutional network 732, and a graph attention network 738, where the graph convolutional network 732 and the graph attention network 738 are regarded as a graph-based reasoning module 730. The graph-based reasoning architecture 700 may use the constructed graphs 715 such as graphs 510 and 520 as constructed in FIGS. 5 and 6 for better understanding the input text and evidence sentences from the semantic level.

The graph-based pre-trained model 720 may take the text 405 and the evidence sentences 425 as the input 710, and outputs word representations 725 and a joint representation 728, where the word representations 725 may be graph-enhanced contextual representations of words. To shorten the distance between two semantically related words on the graph, the graph-based pre-trained model 720 is used to re-calculate the distances among words in the evidence sentences by introducing the distance of two nodes in the constructed graphs, and enhance the relationships among words when calculating contextual word representations. For example, the graph-based pre-trained model 720 may be a Transformer-based pre-trained model. The graph-based pre-trained model 720 simultaneously leverage rich semantic structures of evidence sentences embodied in the graphs 715 and contextual semantics learnt from the pre-trained model. In this way, the reasoning process according to embodiments of the present disclosure employs semantic representation at both word/sub-word level and graph level.

In an example embodiment, there are five evidence sentences $\{s_1, s_2, \ldots s_5\}$ and the word $w_{1i}$ from $s_1$ and the word $w_{5j}$ from $s_5$ are connected on the graph, simply concatenating evidence sentences as a single string fails to capture their semantic-level structure, and would give a large distance to $w_{1i}$ and $w_{5j}$, which is the number of words between them across other three sentences (i.e., $s_2$, $s_3$, and $s_4$). One way to consider the semantical structure is to define an N×N matrix of distances of words along the graph, where N is the total number of words in the evidence sentences.

Another way to consider the semantical structure is to sort the sequence of evidence sentences. For example, the graph-based pre-trained model 720 considers the concept of relation positions, and captures rich contextual representation of words. The graph-based pre-trained model 720 sorts the evidence sentences with a topology sort method, because the closely linked nodes in the graph should exist in neighboring sentences. It is desired that neighboring sentences contain either parent nodes or sibling nodes, so as to better capture the semantic relationship between different evidence sentences. For each node without incident relations, its child nodes may be recursively visited in a depth-first searching way. The depth-first search is an algorithm for traversing or searching tree or graph data structures, and this algorithm may start at a node and explore as far as possible along each branch before backtracking.

After obtaining graph-based relative position of words from the graphs 715, the sorted sequences is then fed into the graph-based pre-trained model 720 so as to generate the word representations 725. Moreover, the joint representation 728 h([CLS]) for the special token [CLS] is also obtained, which denotes the joint representation of the text 405 and the evidence sentences 425 in the Transformer-based architecture. Since the graph-based pre-trained model 720 injected the graph information from graphs 715, the joint representation 728 h([CLS]) can capture the semantic interactions between the text 405 and the evidence sentences 425 at word level.

Now refer to the graph-based reasoning module 730, which includes the graph convolutional network 732 and graph attention network 738. The graph convolutional network 732 takes word representations 725 and graphs 715 as input, and outputs node representations 735 of nodes in the graphs. For example, the graph convolutional network 732 may output node representations of nodes 511, 512, 513 in the text graph 510, and may output node representations of nodes 611, 612, 613, 614, 621, 622, 623, 624, 631, 632, 633 in the evidence graph 520. The graph convolutional network 732 may be a multilayer neural network, and it uses the graph as an input, integrates the neighborhood node feature and structure information of the graph nodes, and represents them as a vector.

The graph convolutional network 732 exploits graph information from graphs 715 beyond the word level. The graph convolutional network 732 calculates a node representation of a node by averaging the word representations of all words contained in the node. Then, the graph convolutional network 732 may have multiple layers to update the node representation by aggregating node representations from their neighbors on the same graph. For example, a constructed graph may be denoted as G, and a matrix containing node representations of all nodes in this graph G may be denoted as $H \in \mathcal{R}^{N^v \times d}$, where $N^v$ denotes the number of nodes in graph G, and d denotes the dimension of each node representation. Each row $H_i \in \mathcal{R}^d$ is the node representation of the node i. In some embodiments, an adjacency matrix A of graph G and a degree matrix D of graph G may be introduced, and self-loops may be added to matrix A and $D_{ij} = \Sigma_j A_{ij}$.

One graph convolutional network layer may aggregate information through one-hop edges, which may be calculated via equation (2)

$$H_i^{(1)} = \rho(\tilde{A} H_i W_0) \quad (2)$$

Wherein $H_i^{(1)} \in \mathcal{R}^d$ denotes the new d-dimension node representation of node i, $\tilde{A} = D^{-1/2} A D^{-1/2}$ denotes the normalized symmetric adjacency matrix, $W_0$ denotes a weight matrix, and $\rho$ is an activation function.

To further exploit information from the multi-hop neighboring nodes, the graph convolutional network 732 stack multiple graph convolutional network layers as shown in equation (3).

$$H_i^{(j+1)} = \rho(\tilde{A} H_i^{(j)} W_j) \quad (3)$$

Wherein j denotes the layer number, $H_i^0$ is the initial node representation of node i initialized from the word representations. $H^{(k)}$ may be referred to as H, which indicates the node representations of all nodes in a graph updated by k-layer graph convolutional network.

The node representations 735 output by the graph convolutional network 732 may include node representations $H_c$ of all nodes in text graph 510 and node representations $H_e$ of all nodes in evidence graph 520. The graph attention network 738 takes $H_c$, $H_e$ and h([CLS]) as input, and generates the final output 435. The graph attention network 738 may align graph-level node representations $H_c$, $H_e$ and then make the final prediction.

The graph attention network 738 may explore the related information between graphs 510 and 520 and make semantic alignment for final prediction. Let $H_c \in \mathcal{R}^{N_c^v \times d}$ and $H_e \in \mathcal{R}^{N_e^v \times d}$ denotes matrices containing node representations of all nodes in text graph 510 and node representations of all nodes in evidence graph 520, wherein $N_c^v$ denotes the number of node in the text graph 510, and $N_e^v$ denotes the number of node in the evidence graph 520, d denotes the dimension of each node representation. The graph attention network 738 is an attention-based neural network architecture that operates on graph-structured data.

In some embodiments, the graph attention network 738 may use a graph attention mechanism to generate text-specific evidence representation for each node in the text graph 510. The graph attention network 738 takes $h_c^i \in H_c$ as query and takes all node representations $h_e^j \in H_e$ as keys, and perform a graph attention on the nodes. For example, the graph attention network 738 uses an attention mechanism a: $\mathcal{R}^d \times \mathcal{R}^d \to \mathcal{R}$ to compute attention coefficient via equation (4):

$$e_{ij} = a(W_c h_c^i, W_e h_e^j) \quad (4)$$

Wherein $e_{ij}$ denotes the importance of evidence node j to the text node i, $W_c \in \mathcal{R}^{F \times d}$ and $W_e \in \mathcal{R}^{F \times d}$ are weight matrices, F denotes the dimension of attention feature, and a denotes the dot-product function.

In some embodiments, the graph attention network 738 may normalize $e_{ij}$ to obtain normalized $a_{ij}$ using the softmax function as shown in equation (5):

$$a_{ij} = softmax_j(e_{ij}) = \frac{\exp(e_{ij})}{\sum_{k \in N_e^U} \exp(e_{ik})} \quad (5)$$

Next, the graph attention network 738 may calculate a text-centric evidence representation $X = [x_1, \ldots, x_{N_v^v}]$ using the weighted sum over $H_e$ via the equation (6):

$$x_i = \sum_{j \in N_e^U} \alpha_{ij} h_e^j \quad (6)$$

The graph attention network 738 then may perform node-to-node alignment and calculate aligned vectors $A = [a_1, \ldots, a_{N_c^v}]$ by the text node representation and the text-centric evidence representation X via the equation (7):

$$a_i = f_{align}(h_c^i, x^i) \quad (7)$$

Wherein $f_{align}$ denotes the alignment function and may be designed such as by the equation (8):

$$f_{align}(x, y) = W_a[x, y, x-y, x \odot y] \quad (8)$$

Wherein $W_a \in \mathcal{R}^{d \times r^* d}$ is a weight matrix, and $\odot$ is element-wise Hadamard product.

The graph attention network 738 performs mean pooling over $A = [a_1, \ldots, a_{N_c^v}]$ so as to obtain the graph representation g, and generates the final output 435 based on the concatenated vector of the graph representation g and the joint representation 728 h([CLS]). The output 435 may comprise a label or classification indicating its veracity such as "TRUE/SUPPORTED," "FALSE/REFUTED," or "NOT ENOUGH INFO (NEI)," indicating that the statement in the text is supported by the evidence sentences, refuted by the evidence sentences, or is not verifiable, respectively. In addition, the output 435 may also comprise the related evidence sentences for drawing the conclusion along with the label or classification.

Accordingly, the graph-based reasoning architecture 700 of the present disclosure requires understanding the syntax of each evidence sentence, and both the graph-based pre-trained model 720 and the graph convolutional network 732 have model innovations of taking the graph information from the graphs 715 into consideration. In addition, the graph-based pre-trained model 720 and the graph convolutional network 732 may be trained separately. For example, the graph-based pre-trained model 720 may be trained first, and the graph convolutional network 732 is then trained while parameters of the graph-based pre-trained model 720 are fixed.

As an example scenario, by use of the fact checking approach based on the semantic graphs, embodiments of the present disclosure can detect the probability of given news being a fake one before publishing the news on a website. This would be very helpful for the human reviewers when they verify whether the news is true or false.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single implementation. Conversely, various features that are described in the context of a single implementation may also be implemented in multiple embodiments separately or in any suitable subcombination.

Some example embodiments of the present disclosure are listed below.

In one aspect, there is provided a computer-implemented method. The method comprises: obtaining a set of evidence sentences associated with a text to be fact checked; constructing a first graph indicating semantic information of the text and a second graph indicating semantic information of the set of evidence sentences; and determining a veracity of a statement in the text based on the first and second graphs.

In some embodiments, wherein obtaining a set of evidence sentences associated with a text to be fact checked comprises: retrieving a plurality of documents related to the text from an evidence database; and selecting the set of evidence sentences from sentences in the plurality of documents.

In some embodiments, wherein constructing the second graph comprises: generating a plurality of subgraphs from the set of evidence sentences through semantic role labelling, the subgraphs comprising a plurality of semantic elements as a plurality of nodes in the second graph; creating edges for nodes within a subgraph of the plurality of subgraphs; creating one or more edges for nodes across different subgraphs of the plurality of subgraphs; and constructing the second graph based on the plurality of nodes and the created edges.

In some embodiments, wherein creating one or more edges for nodes across different subgraphs of the plurality of subgraphs comprises: in accordance with a determination that any of the following conditions is satisfied, creating an edge between a first node in a first subgraph and a second node in a second subgraph of the plurality of subgraphs: (1) a first entity in the first node equals a second entity in the second node, (2) the first entity contains the second entity, and (3) the number of overlapped words between the first entity and the second entity is larger than a predefined threshold, such as an half of the minimum number of words in the first entity and the second entity.

In some embodiments, wherein determining a veracity of a statement in the text based on the first and second graphs comprises: sorting the evidence sentences according to the second graph so as to obtain the sorted evidence sentences; determining word representations of words in the text and the sorted evidence sentences using a relative position encoding-based model; and determining a joint representation of the text and the sorted evidence sentences using the relative position encoding-based model.

In some embodiments, wherein determining a veracity of a statement in the text based on the first and second graphs further comprises: determining node representations of nodes in the first graph based on the word representations and the first graph using a graph convolutional network; and determining node representations of nodes in the second graph based on the word representations and the second graph using the graph convolutional network.

In some embodiments, wherein determining node representations of nodes in the second graph comprises: generating a first node representation of a first node in the second graph by averaging word representations of words included in the first node; and updating the first node representation by aggregating at least a second node representation of a second node neighbor to the first node in the second graph.

In some embodiments, wherein determining a veracity of a statement in the text based on the first and second graphs further comprises: determining a graph representation based on the node representations in the first and second graphs using a graph attention network; and determining the veracity of the statement in the text based on the graph representation and the joint representation.

In another aspect, there is provided an electronic device. The electronic device comprises a processing unit and a memory coupled to the processing unit and storing instructions thereon. The instructions, when executed by the processing unit, perform acts comprising: obtaining a set of evidence sentences associated with a text to be fact checked; constructing a first graph indicating semantic information of the text and a second graph indicating semantic information of the set of evidence sentences; and determining a veracity of a statement in the text based on the first and second graphs.

In some embodiments, wherein obtaining a set of evidence sentences associated with a text to be fact checked comprises: retrieving a plurality of documents related to the text from an evidence database; and selecting the set of evidence sentences from sentences in the plurality of documents.

In some embodiments, wherein constructing the second graph comprises: generating a plurality of subgraphs from the set of evidence sentences through semantic role labelling, the subgraphs comprising a plurality of semantic elements as a plurality of nodes in the second graph; creating edges for nodes within a subgraph of the plurality of subgraphs; creating one or more edges for nodes across different subgraphs of the plurality of subgraphs; and constructing the second graph based on the plurality of nodes and the created edges.

In some embodiments, wherein creating one or more edges for nodes across different subgraphs of the plurality of subgraphs comprises: in accordance with a determination that any of the following conditions is satisfied, creating an edge between a first node in a first subgraph and a second node in a second subgraph of the plurality of subgraphs: (1) a first entity in the first node equals a second entity in the second node, (2) the first entity contains the second entity, and (3) the number of overlapped words between the first entity and the second entity is larger than a predefined threshold, such as an half of the minimum number of words in the first entity and the second entity.

In some embodiments, wherein determining a veracity of a statement in the text based on the first and second graphs comprises: sorting the evidence sentences according to the second graph so as to obtain the sorted evidence sentences; determining word representations of words in the text and the sorted evidence sentences using a relative position encoding-based model; and determining a joint representation of the text and the sorted evidence sentences using the relative position encoding-based model.

In some embodiments, wherein determining a veracity of a statement in the text based on the first and second graphs further comprises: determining node representations of nodes in the first graph based on the word representations and the first graph using a graph convolutional network; and determining node representations of nodes in the second graph based on the word representations and the second graph using the graph convolutional network.

In some embodiments, wherein determining node representations of nodes in the second graph comprises: generating a first node representation of a first node in the second graph by averaging word representations of words included in the first node; and updating the first node representation by aggregating at least a second node representation of a second node neighbor to the first node in the second graph.

In some embodiments, wherein determining a veracity of a statement in the text based on the first and second graphs further comprises: determining a graph representation based on the node representations in the first and second graphs using a graph attention network; and determining the veracity of the statement in the text based on the graph representation and the joint representation.

In a further aspect, there is provided a computer program product. The computer program product comprises executable instructions. The executable instructions, when executed on a device, cause the device to perform acts. The acts comprise: obtaining a set of evidence sentences associated with a text to be fact checked; constructing a first graph indicating semantic information of the text and a second graph indicating semantic information of the set of evidence sentences; and determining a veracity of a statement in the text based on the first and second graphs.

In some embodiments, wherein obtaining a set of evidence sentences associated with a text to be fact checked comprises: retrieving a plurality of documents related to the text from an evidence database; and selecting the set of evidence sentences from sentences in the plurality of documents.

In some embodiments, wherein constructing the second graph comprises: generating a plurality of subgraphs from the set of evidence sentences through semantic role labelling, the subgraphs comprising a plurality of semantic elements as a plurality of nodes in the second graph; creating edges for nodes within a subgraph of the plurality of subgraphs; creating one or more edges for nodes across different subgraphs of the plurality of subgraphs; and constructing the second graph based on the plurality of nodes and the created edges.

In some embodiments, wherein creating one or more edges for nodes across different subgraphs of the plurality of subgraphs comprises: in accordance with a determination that any of the following conditions is satisfied, creating an edge between a first node in a first subgraph and a second node in a second subgraph of the plurality of subgraphs: (1) a first entity in the first node equals a second entity in the second node, (2) the first entity contains the second entity, and (3) the number of overlapped words between the first entity and the second entity is larger than a predefined threshold, such as an half of the minimum number of words in the first entity and the second entity.

In some embodiments, wherein determining a veracity of a statement in the text based on the first and second graphs comprises: sorting the evidence sentences according to the second graph so as to obtain the sorted evidence sentences; determining word representations of words in the text and the sorted evidence sentences using a relative position encoding-based model; and determining a joint representation of the text and the sorted evidence sentences using the relative position encoding-based model.

In some embodiments, wherein determining a veracity of a statement in the text based on the first and second graphs further comprises: determining node representations of nodes in the first graph based on the word representations and the first graph using a graph convolutional network; and determining node representations of nodes in the second graph based on the word representations and the second graph using the graph convolutional network.

In some embodiments, wherein determining node representations of nodes in the second graph comprises: generating a first node representation of a first node in the second graph by averaging word representations of words included in the first node; and updating the first node representation by aggregating at least a second node representation of a second node neighbor to the first node in the second graph.

In some embodiments, wherein determining a veracity of a statement in the text based on the first and second graphs further comprises: determining a graph representation based on the node representations in the first and second graphs using a graph attention network; and determining the veracity of the statement in the text based on the graph representation and the joint representation.

Although the present disclosure has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments.

We claim:

1. A computer-implemented method, comprising:
   obtaining, from an evidence database, a set of evidence sentences associated with a text to be fact checked, the text to be fact checked received as input by a computing device;
   constructing, by the computing device, a first graph indicating semantic information of the text and a second graph indicating semantic information of the set of evidence sentences;
   inputting the first graph and the second graph into a graph-based pre-trained model to generate text word representations, evidence word representations, and a joint text-evidence representation;
   generating, by a graph convolutional network, node representations for the text word representations and the evidence word representations;
   determining, by the computing device, a veracity of a statement in the text by evaluating the node representations and the joint text-evidence representation using a graph attention network; and
   generating an output for transmission that includes the veracity of the statement.

2. The method according to claim 1, wherein obtaining a set of evidence sentences associated with a text to be fact checked comprises:
   retrieving a plurality of documents related to the text from an evidence database; and
   selecting the set of evidence sentences from sentences in the plurality of documents.

3. The method according to claim 1, wherein constructing the second graph comprises:
   generating a plurality of subgraphs from the set of evidence sentences through semantic role labelling, the subgraphs comprising a plurality of semantic elements as a plurality of nodes in the second graph;
   creating edges for nodes within a subgraph of the plurality of subgraphs;
   creating one or more edges for nodes across different subgraphs of the plurality of subgraphs; and
   constructing the second graph based on the plurality of nodes and the created edges.

4. The method according to claim 3, wherein creating one or more edges for nodes across different subgraphs of the plurality of subgraphs comprises:
   in accordance with a determination that any of the following conditions is satisfied, creating an edge between a first node in a first subgraph and a second node in a second subgraph of the plurality of subgraphs: (1) a first entity in the first node equals a second entity in the second node, (2) the first entity contains the second entity, and (3) a number of overlapped words between the first entity and the second entity is larger than a predefined threshold.

5. The method according to claim 3, wherein determining a veracity of a statement in the text by evaluating the node representations and the joint text-evidence representation using a graph attention network comprises:
   sorting the evidence sentences according to the second graph so as to obtain the sorted evidence sentences;
   determining word representations of words in the text and the sorted evidence sentences using a relative position encoding-based model; and
   determining a joint representation of the text and the sorted evidence sentences using the relative position encoding-based model.

6. The method according to claim 5, wherein determining a veracity of a statement in the text by evaluating the node representations and the joint text-evidence representation using a graph attention network further comprises:
   determining, based on the word representations and the first graph, node representations of nodes in the first graph using the graph convolutional network; and
   determining, based on the word representations and the second graph, node representations of nodes in the second graph using the graph convolutional network.

7. The method according to claim 6, wherein determining node representations of nodes in the second graph comprises:
   generating a first node representation of a first node in the second graph by averaging word representations of words included in the first node; and
   updating the first node representation by aggregating at least a second node representation of a second node neighbor to the first node in the second graph.

8. The method according to claim 6, wherein determining a veracity of a statement in the text based on the first and second graphs further comprises:
   determining a graph representation based on the node representations in the first and second graphs using a graph attention network; and
   determining the veracity of the statement in the text based on the graph representation and the joint representation.

9. An electronic device, comprising:
   a processing unit; and
   a memory coupled to the processing unit and storing instructions thereon, the instructions, when executed by the processing unit, performing acts comprising:
      obtaining, from an evidence database, a set of evidence sentences associated with a text to be fact checked, the text to be fact check received as input of the electronic device;
      constructing a first graph indicating semantic information of the text and a second graph indicating semantic information of the set of evidence sentences;
      inputting the first graph and the second graph into a graph-based pre-trained model to generate text word representations, evidence word representations, and a joint text-evidence representation;
      generating, by a graph convolutional network, node representations for the text word representations and the evidence word representations;
      determining a veracity of a statement in the text by evaluating the node representations and the joint text-evidence representation using a graph attention network; and
      generating an output for transmission that includes the veracity of the statement.

10. The device according to claim 9, wherein obtaining a set of evidence sentences associated with a text to be fact checked comprises:
    retrieving a plurality of documents related to the text from an evidence database; and
    selecting the set of evidence sentences from sentences in the plurality of documents.

11. The device according to claim 9, wherein constructing the second graph comprises:
    generating a plurality of subgraphs from the set of evidence sentences through semantic role labelling, the subgraphs comprising a plurality of semantic elements as a plurality of nodes in the second graph;
    creating edges for nodes within a subgraph of the plurality of subgraphs;

creating one or more edges for nodes across different subgraphs of the plurality of subgraphs; and constructing the second graph based on the plurality of nodes and the created edges.

12. The device according to claim 11, wherein creating one or more edges for nodes across different subgraphs of the plurality of subgraphs comprises:

in accordance with a determination that any of the following conditions is satisfied, creating an edge between a first node in a first subgraph and a second node in a second subgraph of the plurality of subgraphs: (1) a first entity in the first node equals a second entity in the second node, (2) the first entity contains the second entity, and (3) a number of overlapped words between the first entity and the second entity is larger than a predefined threshold.

13. The device according to claim 11, wherein determining a veracity of a statement in the text by evaluating the node representations and the joint text-evidence representation using a graph attention network comprises:

sorting the evidence sentences according to the second graph so as to obtain the sorted evidence sentences;

determining word representations of words in the text and the sorted evidence sentences using a relative position encoding-based model; and determining a joint representation of the text and the sorted evidence sentences using the relative position encoding-based model.

14. The device according to claim 13, wherein determining a veracity of a statement in the text by evaluating the node representations and the joint text-evidence representation using a graph attention network further comprises:

determining node representations of nodes in the first graph based on the word representations and the first graph using the graph convolutional network; and determining node representations of nodes in the second graph based on the word representations and the second graph using the graph convolutional network.

15. The device according to claim 14, wherein determining node representations of nodes in the second graph comprises:

generating a first node representation of a first node in the second graph by averaging word representations of words included in the first node; and updating the first node representation by aggregating at least a second node representation of a second node neighbor to the first node in the second graph.

16. The device according to claim 14, wherein determining a veracity of a statement in the text based on the first and second graphs further comprises:

determining a graph representation based on the node representations in the first and second graphs using a graph attention network; and determining the veracity of the statement in the text based on the graph representation and the joint representation.

17. A non-transitory computer program product comprising executable instructions, the executable instructions, when executed on a device, cause the device to perform acts comprising:

obtaining, from an evidence database, a set of evidence sentences associated with a text to be fact checked, the text to be fact checked received as input by a computing device;

constructing, by the computing device, a first graph indicating semantic information of the text and a second graph indicating semantic information of the set of evidence sentences;

inputting the first graph and the second graph into a graph-based pre-trained model to generate text word representations, evidence word representations, and a joint text-evidence representation;

generating, by a graph convolutional network, node representations for the text word representations and the evidence word representations;

determining, by the computing device, a veracity of a statement in the text by evaluating the node representations and the joint text-evidence representation using a graph attention network; and generating an output for transmission that includes the veracity of the statement.

18. The non-transitory computer program product according to claim 17, wherein constructing the second graph comprises:

generating a plurality of subgraphs from the set of evidence sentences through semantic role labelling, the subgraphs comprising a plurality of semantic elements as a plurality of nodes in the second graph;

creating edges for nodes within a subgraph of the plurality of subgraphs;

creating one or more edges for nodes across different subgraphs of the plurality of subgraphs; and constructing the second graph based on the plurality of nodes and the created edges.

19. The non-transitory computer program product according to claim 18, wherein creating one or more edges for nodes across different subgraphs of the plurality of subgraphs comprises:

in accordance with a determination that any of the following conditions is satisfied, creating an edge between a first node in a first subgraph and a second node in a second subgraph of the plurality of subgraphs: (1) a first entity in the first node equals a second entity in the second node, (2) the first entity contains the second entity, and (3) a number of overlapped words between the first entity and the second entity is larger than a predefined threshold.

20. The non-transitory computer program product according to claim 18, wherein determining a veracity of a statement in the text by evaluating the node representations and the joint text-evidence representation using a graph attention network comprises:

sorting the evidence sentences according to the second graph so as to obtain the sorted evidence sentences;

determining word representations of words in the text and the sorted evidence sentences using a relative position encoding-based model; and determining a joint representation of the text and the sorted evidence sentences using the relative position encoding-based model.

* * * * *